No. 711,701.　　　　　　　　　　　　　　　Patented Oct. 21, 1902.
C. H. & A. D. GRANT.
TRACE HOOK.
(Application filed Apr. 7, 1902.)

(No Model.)

Witnesses
J. P. Britt
Harry Allis Chandler

Inventors
C. H. Grant
A. D. Grant
By Chandler & Chandler
Attorneys

THE NORRIS PETERS CO., PHOTO-LITHO., WASHINGTON, D. C.

UNITED STATES PATENT OFFICE.

CHARLES HOBART GRANT AND ALVAN DODGE GRANT, OF SOUTH RYEGATE, VERMONT.

TRACE-HOOK.

SPECIFICATION forming part of Letters Patent No. 711,701, dated October 21, 1902.

Application filed April 7, 1902. Serial No. 101,736. (No model.)

*To all whom it may concern:*

Be it known that we, CHARLES HOBART GRANT and ALVAN DODGE GRANT, citizens of the United States, residing at South Ryegate, in the county of Caledonia and State of Vermont, have invented certain new and useful Improvements in Trace-Hooks; and we do hereby declare the following to be a full, clear, and exact description of the invention, such as will enable others skilled in the art to which it appertains to make and use the same.

This invention relates to trace-hooks for singletrees; and it has for its object to provide a construction to which the trace-chain may be easily and quickly applied and from which it may be as readily removed and wherein when the chain is engaged with the hook accidental disengagement thereof will be prevented.

A further object of the invention is to provide a construction which may be adjusted to hold the engaged link of the chain snugly against the bight of the hook.

Other objects and advantages of the invention will be understood from the following description.

Figure 1:
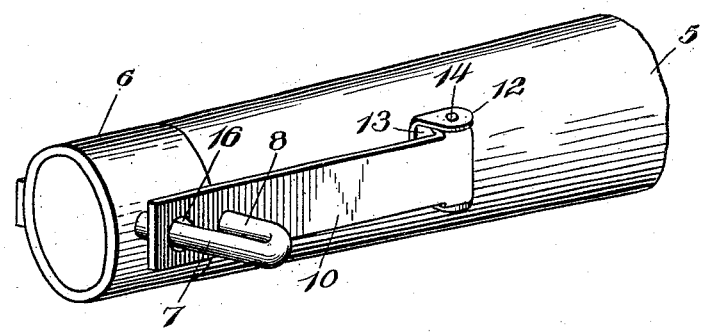
Figure 2:
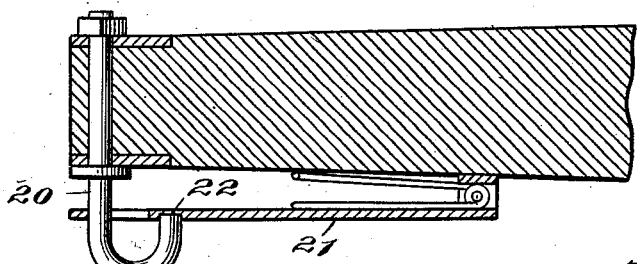
Figure 3:
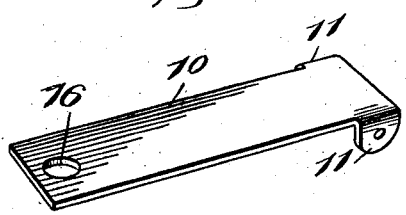
Figure 4:
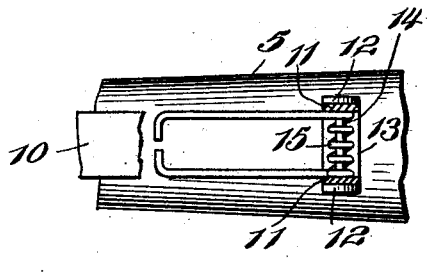

In the drawings forming a portion of this specification, and in which like numerals of reference indicate similar parts in the several views, Figure 1 is a perspective view showing one end of a singletree with the present hook attached. Fig. 2 is a longitudinal section showing a modification of the invention. Fig. 3 is a detail perspective view of the keeper shown in Fig. 1. Fig. 4 is a plan view of the rear portion of the keeper and adjacent portion of the singletree, the keeper being broken away to show the arrangement of the spring.

Referring now to the drawings, there is shown a singletree 5, one end portion only thereof being illustrated, and on this end is disposed the ferrule 6, it being understood that both ends of the singletree are equipped in the same manner. Through the ferrule and the end of the singletree is formed a perforation in which is engaged the stem 7 of a hook, the bight of the hook being directed inwardly of the singletree and the bill 8 being taken parallel with the stem, as shown. The hook is held in engaged position by means of a nut engaged with the end of the stem beyond the singletree or in any other suitable manner. This hook is adapted for engagement by a link of a trace-chain or with the eye of a trace, and to prevent disengagement of the trace from the hook a keeper is provided. The keeper, as shown in Fig. 3 of the drawings, consists of the plate 10, at one end of which are the downwardly-directed parallel ears 11, which are adapted to lie between the upwardly-directed ears 12 of the plate 13, which latter is secured against the face of the singletree, the ears having alining perforations to receive a pivot-pin 14, upon which is wound a helical spring 15, the ends of which are taken at a right angle to the axis of the helix to lie against the lower face of the plate and the upper face of the singletree, respectively, the extreme ends of the wire of the spring being bent laterally in opposite directions to bear against the adjacent faces of the plate and singletree, respectively. In the free end of the keeper-plate is formed an eye 16, through which the stem of the hook is passed, the eye being of such size as to prevent the passage of the hook through it, and when the plate is in position the helical spring, above described, holds it in close contact with the end of the bill of the hook, the plate at the sides of the eye bridging the opening of the hook, as shown. When the trace is to be engaged with the hook, the keeper-plate is pressed in the direction of the singletree against the tendency of the helical spring to open the hook, and after the trace has been engaged in the usual manner the keeper is released and the spring moves it against the tip of the bill of the hook and prevents the trace dropping from the hook.

In Fig. 2 of the drawings there is shown a construction wherein the stem 20 of the hook is pivotally mounted in the end of the singletree and the ferrule thereon, so that the hook may be swung to project with its bill beyond the end of the singletree to facilitate engagement of a trace therewith under certain conditions, the hook being then rotated to bring the bill over the singletree, and to hold the hook in the latter position the keeper-plate 21 has a depression 22 therein, into which the tip of the bill of the hook engages, the hook being thus effectively held against rotation. Furthermore, to accommodate trace-straps beyond the eye engaged with the hook the keeper-plate is broadened at the eye to permit the free end of the trace to be taken through the eye and then bent laterally between the keeper-plate and the singletree, as shown in Fig. 2. With this latter construction also the hook may be permitted to project beyond the end of the singletree, and the keeper-plate will be then moved by its helical spring to bring the outer end of the plate into the hook and against the trace-link to hold it snugly in place, thus preventing rattling in those styles of traces including a strap having a terminal ring.

It will be understood that in practice other modifications of the invention may be made and that any suitable materials and proportions may be used for the various parts without departing from the spirit of the invention.

What is claimed is—

1. The combination with a singletree, of a hook having its stem engaged through the singletree, a plate secured to the singletree in the rear of the hook and having spaced ears, a keeper-plate having depending spaced ears disposed between the ears of the first-named plate, a pivot-pin engaged through the ears, and a helical spring wound upon the pin and having its ends disposed against the singletree and keeper-plate respectively, said keeper-plate having an eye at its free end through which the stem of the hook is passed.

2. The combination with a singletree, of a hook pivotally mounted therein, a plate having an eye therein through which the stem of the hook is passed, said plate having a socket in the rear of the eye to receive the end of the bill of the hook and hold the latter against rotation, and means for holding the plate yieldably with the bill of the hook in the socket.

In testimony whereof we affix our signatures in presence of two witnesses.

CHARLES HOBART GRANT.
ALVAN DODGE GRANT.

Witnesses:
 MAILA Y. GEORGE,
 W. T. GEORGE.